Nov. 20, 1956     M. N. LABERNIE     2,771,114
TIRE TREAD CONSTRUCTION
Filed Dec. 15, 1953
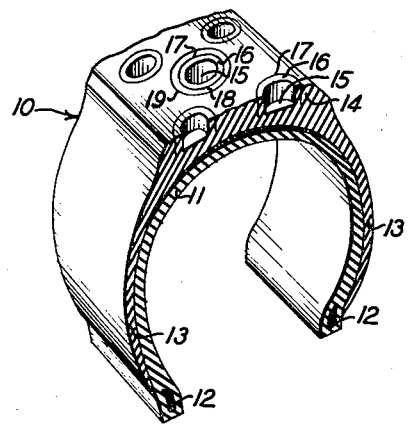
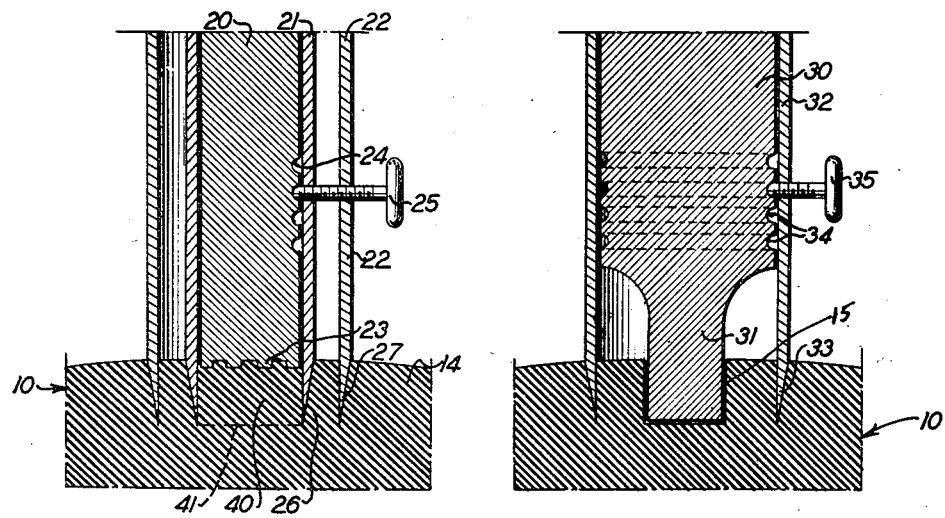
INVENTOR
MARTIN NEGRETE LABERNIE
BY George H. Corey
ATTORNEY United States Patent Office 2,771,114
Patented Nov. 20, 1956

2,771,114

TIRE TREAD CONSTRUCTION

Martin Negrete Labernie, Madrid, Spain

Application December 15, 1953, Serial No. 398,384

Claims priority, application Spain February 20, 1953

4 Claims. (Cl. 152—209)

This invention relates to new and useful improvements in elastic tread or friction surfaces. More specifically, the invention deals with a novel tire tread that aids in maintaining lower temperatures within the tire carcass and in increasing the frictional contact of the tire with an opposing surface.

One of the difficult problems of the tire industry is that of excessive heating of tires, a problem which becomes even greater with the general improvements in roads and automobiles which result in greater traveling speeds of the tires over road surfaces.

A further problem has been one of securing sufficient traction or gripping action between tires and the road surface, especially in times of emergency when it is desired to stop quickly. It is well known, for example, that an icy road surface or even a wet road surface greatly increases the tendency to slipping or skidding of automobile tire treads thereover, and may cause the driver to lose control of the car both as to direction of travel and safe stoppage of the vehicle.

Many tire treads have been developed in response to either or both of these particular problems. However, generally speaking, the prior proposals which have involved provision of grooves, slots or spaced recesses in the tire tread have not furnished a satisfactory solution to the two problems. If the grooves, slots or recesses are made deep and wide enough to eliminate the heat problem they tend to be too close to the tire carcass and therefore weaken the tire and render it subject to early deterioration, blow-outs and so forth. Constructions that have been most successful in coping with the heat problem usually have not been well adapted to resist the tendency to slipping or skidding on wet or icy surfaces.

Furthermore, if too much of the external surface of the tire is removed in forming a tread the remaining surface must carry too much load per surface area and thus quickly wears away.

It is an object of this invention to provide a tire tread that will effectively prevent overheating of the tire carcass without weakening the tire structure.

It is a further object of this invention to provide a tire tread that will give increased traction with the road surface, especially when wet or icy, without greatly reducing the surface area of tread that contacts the road surface.

It is another object of this invention to provide a tire tread that offers reduced carcass temperatures and increased surface traction and yet will have longer life than most tire treads on the market today.

Other and further objects and advantages will be appreciated or understood by those skilled in this art or will be apparent or pointed out hereinafter.

In the drawings:

Fig. 1 is a perspective view of a segment of a tire having a tread in accordance with my invention;

Fig. 2 is a vertical cross-section of a tool adapted to simultaneously form the several elements of the tread; and Fig. 3 is a vertical cross-section of a tool adapted to be used in producing correctly spaced annular incisions about the previously formed vent openings which are one of the feaures of the invention.

Referring to the drawings in detail this invention as illustrated may be embodied in the ordinary automobile or truck tire. A tire 10 comprises a carcass 11 that contains reinforcing elements 12 and is surrounded by side walls 13 and a tread 14. The tread portion includes a plurality of cavities 15 which are each surrounded by a concentric ring 16. The ring 16 is defined on its outer periphery by an annular incision 17 and each ring 16 with its cavity 15 constitutes a very effective vent unit. It may be desirable to provide an additional concentric ring 18 surrounding the first ring 16 and being defined along the inner periphery by the annular incision 17 and along the outer periphery by an annular incision 19. Only one of these double ring units has been shown in Fig. 1 but it will be appreciated that any number or all of the cavities could be so surrounded or that there may be several rings per single cavity. The size and pattern of these vent units may be variable but the depth of the cavity and incision must not be close enough to the tire carcass to weaken the tire. However, due to the spaced arrangement of the vents and the relatively small surface area openly exposed at the bottom of each cavity they may extend inwardly closer to the carcass than with continuous slots or cavities of greater individual or collective areas. The depth of the cavities and incisions will generally be equal but not necessarily so.

The vent units comprised by the concentric rings and their enclosed cavities are very useful in preventing overheating because a considerable surface of the internal tire portion is at all times exposed to the atmosphere. Moreover, the extent of the exposure to the atmosphere, or, perhaps more accurately, the free access of the atmosphere to the interior of the cavity of each unit substantially unaffected by the compressive action on the tire tread due to the weight of the vehicle being supported even when the portion of the tread carrying the particular cavity or cavities has been brought toward the lower side of the wheel during its rotation. To be more specific, when the tire rotates so that portions of the tread surface are continually moving in and out of the load bearing zone these vent units will be alternately compressed and released, at which time the concentric ring, being free from attachment at its outer side to the tread surface immediately surrounding it, will tend to retain this shape without substantial deformation while the tread area immediately adjacent the opposite sides of the concentric ring in the plane of rotation of the tire will tend to move away from the side walls of the ring. The movement away from the ring contributes ventilation of the ring and thus the cooling of the tire in addition to the cooling effect of the cavities within the rings. This feature of the vent units, which retain their shape and ability to facilitate circulation of air within them for cooling of the tire at all times despite the alternate compression and release from compression imposed upon the tire tread during the use of the tire, is one of the important aspects of the invention.

Another function of the vent units is to increase and maintain more effective contact of the tire with the road surface under varied weather conditions. The cavities themselves will tend to create a suction and thus increase traction between the tire tread and the road surface. This will be increased, moreover, by the movement described above whereby areas of the tread surrounding and immediately adjacent the concentric rings tend to move slightly relative to the rings during rotation of the tire. Furthermore, in the case of an emergency when brakes have been suddenly applied and the tire begins to skid over the road surface the relative movement between the concentric rings and the remainder of the tread surface will be augmented and will create extra traction and gripping of the road surface when it is most needed. Because of the incisions and the cavities, there is also a greater tendency for the tread surface to cling to the supporting surface and resist sliding or skidding over such a surface when the car is being stopped or there is a change of direction that would normally produce a skidding action. The resulting increased traction serves to stop the vehicle more quickly or to start the tire to rotating once more either of which is very helpful in the prevention of automobile accidents.

Although the embodiment disclosed herein relates to a tire tread it will be readily appreciated that other elastic friction surfaces may be treated in the same manner, such as belting, shoe heels and soles and other gripping or friction surfaces that are desired to be rendered non-slipping.

The novel tools shown herein have been found satisfactory by me to produce the annular incisions and the vent cavities previously described. The tool shown in Fig. 2 simultaneously produces the entire vent unit. This tool comprises a circular extractor 20 which is immediately surrounded by a sharp annular cavity cutting unit 21 which in turn is surrounded but spaced therefrom by an annular incision cutting unit 22 of greater diameter than unit 21. The extractor 20 is shown as having a plurality of teeth 23 at the bottom thereof which penetrate into the rubber button which is to be removed in forming the cavity 15. The extractor 20 also acts as a butt which serves to stop the penetration of the cutting units after the teeth 23 have penetrated the tread surface. By means of notches 24 located along one side of the extractor and a set screw 25 mounted in the two cutting units 21 and 22 the cutting depth of the tool may be adjusted. At the bottom of cutting units 21 and 22 respectively are located sharp cutting edges 26 and 27. The entire unit shown in Fig. 2 is rotated and advanced manually or by any suitable power driven mechanical means not shown.

Fig. 3 shows a tool that may be used to form the annular incision 17 about a previously formed vent cavity. This tool includes an inner guide 30 with a center extension 31 located at the bottom end thereof and sized so as to fit within a preformed cavity 15. Mounted immediately outside of the inner guide is an annular incision cutting unit 32 with a sharp cutting edge 33. The inner guide 30 is provided with circular notches 34 to receive a set screw 35 mounted in the cutting unit 32 so as to adjust the relative positions of the inner guide and the cutting unit to control the depth of the incision made by the blade 33.

The operations of the above mentioned tools will now be described. It will be appreciated that the cavity cutting unit 21 and the extractor therein 20 may be used by itself or as part of the combined cutting and extracting tool shown in Fig. 2. In a combined cutting and extracting procedure for forming treads, the extractor 20, previously adjusted to the proper depth, and the cavity cutting unit 21, both of which are moved as a single unit, are pressed into contact with the tire tread surface and pressure applied until the teeth 23 have penetrated the tire surface and the adjacent end surface of the extractor will not allow any further penetration by the cutting unit. It will be noted that after the teeth and the annular cutting edge of the cutting unit have penetrated the tire tread surface here will be a button 40 which has been clearly cut free on all sides but which is still continuous with the tire at the base 41. The rotation of the extractor 20 however will cause the button 40 to exceed the elastic limit of the rubber and a relatively smooth separation will occur near or on the line representing base 41. The extractor and cavity cutting unit are then removed. The incision cutting unit of Fig. 3, which also rotates as a unit, may then be brought into contact with the tread surface so that stud 31 fits snugly into cavity 15 to thus center the cavity within the annular incision which is formed by the sharp annular cutting edge 33 as pressure is applied to the unit with or without a rotating movement. The center guide 30 has previously been adjusted so that the edges 33 are stopped at the proper depth. Preferably this depth is level with the depth of the cavity 15 but it may be either somewhat deeper or shallower.

To perform the complete operation more quickly the combined tool shown in Fig. 2 including the outer incision cutting unit 22, 27, may be used. This entire combined tool rotates as a unit and it may be adjusted for proper depth by use of the notches 24 and a set screw or screws 25. If it is desired to produce different relative depths of the outer annular incision and the cavity when using the combined tool shown in Fig. 2, this may be arranged by providing a series of openings in the wall of the annular cutting unit 21 in registry with the recesses 24. After the extractor 20 has been properly adjusted the rotating tool is brought into contact with the tread surface and pressure applied thereto until the teeth 23 have penetrated the rubber surface and stop further penetration of the unit. Then the button 40 will be rotated and separated from its base as described hereinbefore. Thus it will be noted that in using this tool the cavity cutting and the incision cutting units operate simultaneously while the extractor operates almost immediately thereafter.

If desired a plurality of the tools may be mounted in suitably spaced relation in an operating head and manipulated as a unit so as to provide simultaneously a plurality of the vent units on the tread surface of a tire. Moreover with these tools, which are also portable, the operation may be completed without removing the tire from its rim or the automobile.

Instead of forming the vent cavities 15 after the tire has been molded, these cavities may be molded into the tread surface as a part of the tire-forming operation. The incisions or slits 17 which define the outer periphery of the annular rings 16 are preferably formed after the tire tread has been molded since in this way it is insured that an open space or slot between the annular ring and the surrounding wall will be avoided. The presence of a slot would reduce the non-skidding action of the vent units. However, the formation of the annular slits by molding is not excluded.

I do not wish to be limited to the tools or methods disclosed herein but only by the scope of the appended claims.

I claim:

1. An elastic tire construction comprising a carcass, side walls and a tread surface, said tread surface including a plurality of substantially cylindrical cavities, a concentric ring surrounding each said cavity, and an annular incision defining the outer periphery of each said concentric ring.

2. An elastic tire construction comprising a carcass, side walls and a tread surface, said tread surface including a plurality of substantially cylindrical cavities, a plurality of concentric rings surrounding each said cavity, and an annular incision defining the outer periphery of each said concentric ring.

3. An elastic tire tread having incorporated therein a plurality of cavities, a concentric ring surrounding each said cavity, and an annular incision defining the outer periphery of said concentric ring.

4. A traction member comprising an elastic friction surface having incorporated therein a plurality of cavities, a concentric ring surrounding each said cavity, and an annular incision defining the outer periphery of said concentric ring.

References Cited in the file of this patent

UNITED STATES PATENTS

| | | |
|---|---|---|
| 929,632 | Sanford | July 27, 1909 |
| 952,039 | Greenwald | Mar. 15, 1910 |
| 1,335,460 | Rich | Mar. 30, 1920 |
| 1,398,975 | Kenos | Dec. 6, 1921 |
| 1,731,715 | Dunlap | Oct. 15, 1929 |
| 2,267,406 | Krusemark | Dec. 23, 1941 |
| 2,327,028 | Dohrenwend | Aug. 17, 1943 |
| 2,385,712 | Konikoff | Sept. 25, 1945 |
| 2,675,073 | Constantankis | Apr. 13, 1954 |

FOREIGN PATENTS

| | | |
|---|---|---|
| 502,992 | Great Britain | Mar. 29, 1939 |

OTHER REFERENCES

"Aviation Week," vol. 57, No. 6, Oct. 20, 1952, page 3. Published by McGraw-Hill.